US007543969B2

(12) United States Patent
Casanave

(10) Patent No.: US 7,543,969 B2
(45) Date of Patent: Jun. 9, 2009

(54) HEADLIGHT WITH SEVERAL FUNCTIONS FOR MOTOR VEHICLES

(75) Inventor: Sébastien Casanave, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/371,040

(22) Filed: Mar. 7, 2006

(65) Prior Publication Data

US 2006/0203503 A1 Sep. 14, 2006

(30) Foreign Application Priority Data

Mar. 8, 2005 (FR) .................................. 05 02320

(51) Int. Cl.
*B60Q 1/00* (2006.01)

(52) U.S. Cl. ....................... 362/539; 362/297; 362/300; 362/307; 362/308; 362/538; 362/396

(58) Field of Classification Search ....................... None
See application file for complete search history.

(56) References Cited

U.S. PATENT DOCUMENTS 4,677,532 A * 6/1987 Peitz et al. .................. 362/539
4,851,968 A * 7/1989 Nino .......................... 362/539
4,953,063 A * 8/1990 Nino .......................... 362/539
5,055,981 A * 10/1991 Nino .......................... 362/539
5,213,406 A * 5/1993 Neumann et al. ........... 362/512
5,673,990 A * 10/1997 Neumann et al. ........... 362/513
5,718,505 A * 2/1998 Daumueller et al. ........ 362/279
6,007,221 A * 12/1999 Taniuchi et al. ............. 362/465
6,059,435 A * 5/2000 Hamm et al. ............... 362/514
6,354,721 B1 * 3/2002 Zattoni ........................ 362/513
6,554,460 B1 4/2003 Saladin ........................ 362/539
6,556,305 B1 * 4/2003 Aziz et al. .................. 356/512
7,350,946 B2 * 4/2008 Yagi et al. ................... 362/517
2004/0249362 A1 12/2004 Levine et al. ............... 604/523

(Continued)

FOREIGN PATENT DOCUMENTS

DE 3530002 2/1987

(Continued)

OTHER PUBLICATIONS

Dialog English Abstract for DE 3530002.

(Continued)

*Primary Examiner*—Sandra L O'Shea
*Assistant Examiner*—Danielle Dunn
(74) *Attorney, Agent, or Firm*—Locke Lord Bissell & Liddell, LLP

(57) ABSTRACT

A headlight for a motor vehicle designed to fulfill several functions, in particular a dual functions. One of the functions is a beam with cut-off, wherein the headlight comprises a light source, a main elliptical reflector having a scalloped part and an optical axis; a main lens disposed in front of the main elliptical reflector; a retractable shield movable between at least one active position for the cut-off beam and a retracted position for another type of beam; a secondary elliptical reflector coupled to the scalloped part of the main elliptical reflector and having a optical axis inclined with respect to that of the main reflector; and an additional lens disposed in front of the secondary elliptical reflector having an optical axis essentially parallel to that of the main lens.

20 Claims, 3 Drawing Sheets

U.S. PATENT DOCUMENTS

2005/0276062 A1 * 12/2005 Pauty et al. ................. 362/539

FOREIGN PATENT DOCUMENTS

| | | |
|---|---|---|
| EP | 723108 | 11/2001 |
| FR | 2 793 542 | 11/2000 |
| JP | 2003257218 A * | 9/2003 |

OTHER PUBLICATIONS

Dialog English Abstract for FR 2793542.
Search Report for corresponding French Application 05 02 320.
English language Abstract for DE 19501173, issued Jul. 18, 1996, which the priority application for original German language EP 723108 and Abstract for U.S. Patent No. 5,673,990, which is the U.S. counterpart to EP 723108.
English language Abstract for EP 723108.
English language translation of EP 723108.
Dialog English Abstract for DE 3530002, Mar. 6, 2006.
Dialog English Abstract for FR 2793542, Mar. 6, 2006.
Search Report for corresponding French Application 05 02 320, Nov. 4, 2005.
English language Abstract for DE 19501173, issued Jul. 18, 1996, which the priority application for original German language EP 723108 and Abstract for U.S. Patent No. 5,673,990, which is the U.S. counterpart to EP 723108.
English language Abstract for EP 723108, Feb. 14, 2008.
English language translation of EP 723108, Feb. 14, 2008.

* cited by examiner

HEADLIGHT WITH SEVERAL FUNCTIONS FOR MOTOR VEHICLES

FIELD OF INVENTION

The invention relates to a headlight for motor vehicles designed to fulfill several optical functions. In particular, the invention relates to a dual function headlight with one function at least corresponding to a beam with cut-off. This headlight being of the type which comprises:

- a reflector of the elliptical type, having for example an internal focus and an external focus on an optical axis,
- a light source, preferably placed in the vicinity of the internal focus,
- a lens disposed in front of the reflector and preferably having a focus merged with or adjacent to the external focus of the reflector,
- and a retractable shield able to occupy at least one active position for a beam with cut-off, and a retracted position for another type of beam, the shield in the active position preferably having a cut-off edge in the vicinity of the focus of the lens.

BACKGROUND OF THE INVENTION

Multifunction headlights are known, in particular dual function headlights with a halogen light source, which provide the beam with cut-off, in particular a dipped beam and, when the shield is in the retracted position, another type of beam without cut-off. However, this beam without cut-off is generally too weak to constitute an approved main beam so that it is necessary to provide an additional main-beam headlight which is switched on when the shield is retracted.

Multifunction headlights are also known, in particular dual function headlights with a halogen light source, approved only for the production of a beam without cut-off, in particular a main beam, but this beam is narrow and not very homogeneous. Dual-function headlights with a xenon source are approved alone with a main beam of satisfactory width, but the homogeneity also requires to be improved.

SUMMARY OF THE INVENTION

The aim of the invention is in particular to provide a multifunction headlight, in particular a dual function headlight, for motor vehicles, which makes it possible to obtain an improved function without cut-off, in particular a main-beam function, which does not require an additional headlight and which provides a sufficient width of the beam, with good homogeneity. It is also desirable for this headlight to remain relatively simple and economical in design.

According to the invention a headlight for a motor vehicle of the type defined above is characterised in that:

- the elliptical reflector comprises a scalloped (cut out) part, this scalloped area preferably being provided in an area which is substantially not useful optically for the cut-off beam,
- a secondary elliptical reflector is added in the scalloped area of the main reflector, this secondary reflector having an internal focus close to that of the main reflector, the optical axis of the secondary reflector being inclined with respect to that of the main reflector and the external focus of the secondary reflector being distant from the optical axis of the main reflector,
- and an additional lens is disposed in front of the secondary reflector with its focus close to the external focus of the secondary reflector, this additional lens having an optical axis essentially parallel to that of the main lens.

The main lens advantageously consists of a convergent lens and the additional lens also consists of an additional convergent lens. The additional lens can constitute a duplication of the central part of the main lens. In a variant, the additional lens is a divergent lens.

The additional lens can be inserted in a scalloped part of the main lens. The scalloped part of the main lens is situated opposite the scalloped part of the main reflector. Each scalloped part can be situated in the bottom area of the reflector and lens. In a variant, the scalloped part is situated on the right or left of the reflector and main lens. The main lens and the additional lens can be produced in a single moulded piece.

The shield can be formed by a single plate. The retracted position can be obtained by rotation of the shield about its transverse edge remote from the optical axis of the main reflector. The shield can also pass from an optically active position to a retracted position by other movements, for example by translation, in particular in the plane of the shield/ in a substantially vertical plane. The shield can then be arranged so that it has a window in the bottom part: in the "descended" position, the shield is designed so as to allow the light to pass to the main lens and additional lens. "Window" means an opening in the shield of appropriate dimensions and shapes.

The light source can be a halogen lamp with a single filament. Compared with a dual-filament lamp, this choice requires the use of a moving shield. On the other hand, it is advantageous on an optical level, since dual-filament lamps generally require making a large passage hole at the bottom of the mirror, this type of lamp being appreciably bulkier than a single-filament lamp.

Provision can be made for the shield to have only one active position and one retracted position, so as to obtain a dual function. However, provision can also be made for the shield to have not only a retracted function but also at least two active positions, making it possible to obtain several beam functions with different cut-offs. Then, for example, a triple function or multifunction is obtained according to the design of the shield.

According to another possibility, the shield is produced in two parts that can be retracted separately, namely a first part closer to the optical axis of the main reflector, whose retraction makes it possible to obtain a first type of main beam, and a second part, further away from the main optical axis, whose retraction with that of the first part makes it possible to obtain a beam without other cut-off, in particular a stronger main beam.

Optionally, the shield is associated with an additional optical element disposed between the light source and the shield, the additional optical element being in the vicinity of one of the optically active edges of the shield and having at least one reflective surface able to redirect, above the optically active edge of the shield, light rays emitted by the source in the direction of the shield. This additional element can take the form of a plate whose front edge is pressed against the optically active edge of the shield, which is substantially flat and an upward-turned face of which is reflective. This element can be fixed mechanically to the shield, or can form an integral part of it. This element can be designated by the term "folder component".

This folder component is designed so that it returns the rays in a suitable fashion towards the associated lens, rays which, otherwise, would have been lost. This folder component can be associated with one or other of the parts of the shield, in the case where the shield is in several parts, as will be detailed with the help of the example according to FIG. 11.

The beam with cut-off, in particular the dipped beam, is obtained with the two parts of the shield in the active position.

According to a variant, the second part of the shield has a cross section substantially in the form of an L with two arms at right angles with different lengths and is mounted so as to pivot about a transverse axis passing through the vertex of the angle formed by the L. This second part of the shield can occupy a first angular position in which the long arm of the L is in the active position and cooperates with the first part of the shield in the active position in order to give the beam with cut-off; in a second angular position of the second part, the shorter arm of the L is in the active position when the first part of the shield is also in the active position, a space existing between the facing edges of the two parts and allowing the passage of light rays in order to reinforce a central area of the cut-off beam. It is thus possible to obtain an AFS function which corresponds to a dipped function on a motorway. This variant is particularly advantageous with a light source of the xenon lamp type.

Another object of the invention is the motor vehicle equipped with at least one headlight described above.

BRIEF DESCRIPTION OF THE DRAWINGS

The invention consists, apart from the provisions disclosed above, of a certain number of other provisions which will be dealt with more explicitly below with regard to example embodiments described with reference to the accompanying drawings, but which are in no way limiting. In these drawings.

DESCRIPTION OF THE PREFERRED EMBODIMENTS

Figure 1:
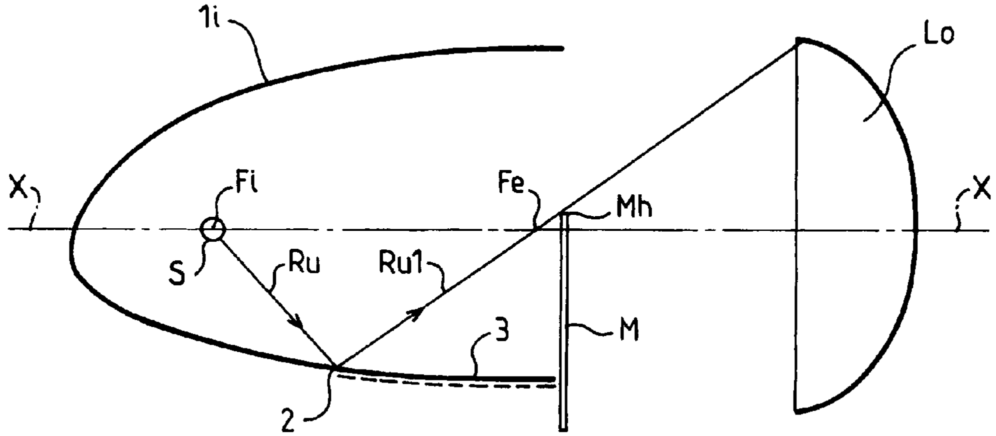
FIG. 1 is a schematic vertical section intended to give an understanding of the design of a headlight according to the invention.

Referring to FIG. 1 of the drawings, a headlight can be seen comprising an elliptical reflector 1*i* having an internal focus Fi and an external focus Fe on an optical axis X-X. A light source S is placed in the vicinity of the internal focus Fi. A lens formed by a convergent lens Lo is disposed in front of the reflector and the focus of the lens is merged with or adjacent to the external focus Fe. A shield M in the active position is essentially orthogonal to the optical axis X-X. The top edge Mh of the shield constitutes a cut-off edge and is in the vicinity of the focus of the lens Lo and of the external focus Fe. The last useful ray Ru for the cut-off beam falls at a point 2 on the reflector 1 such that the reflected ray Ru1 arrives on the peripheral edge of the lens Lo. Thus, the light rays which form in the area 3 situated in front of the point 2 will give reflected rays which will not be recovered by the lens Lo. The area 3 of the reflector 1 is therefore an area which is not useful optically for the production of the cut-off beam.

Figure 2:
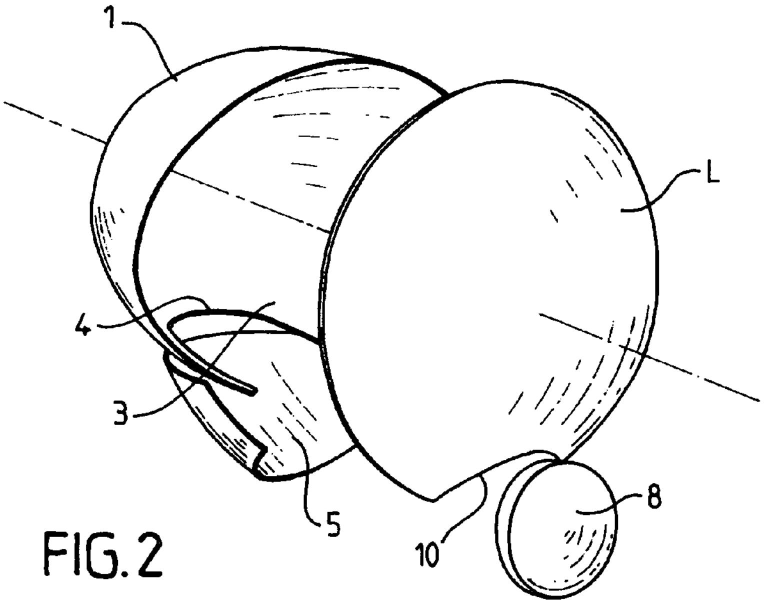
FIG. 2 is a schematic view in exploded perspective of the reflectors and lenses of a headlight according to the invention.

According to the invention, as clearly visible in FIG. 2, the reflector 1 comprises a scalloped part 4 in the area 3 that is not useful optically for the cut-off beam. This scalloped part 4 is situated, according to the example in FIG. 2, at the bottom part of the reflector and has the shape of a scallop open towards the front, that is to say in the direction of propagation of the light beam.

A secondary elliptical reflector 5 (FIGS. 2 and 3) is added in the scalloped area 4. The secondary reflector 5 is formed by a ellipsoid part whose concavity is turned towards the inside of the reflector 1. The contour of the secondary reflector 5 is connected to the contour of the scallop 4 and opens towards the front. The secondary reflector 5 forms a kind of protrusion with respect to the surface of the reflector 1.

The secondary reflector 5 comprises an active front part 5*a* which participates in the production of the light beam, and rear part 5*b* which is not reached by the light rays coming from the source S and which serves for connection with the main reflector 1. The front part 5*a* is situated on a surface of an ellipsoid whose extension is shown in broken lines in FIGS. 3 and 6, which has the same internal focus Fi as the main reflector 1. The major axis Y-Y of the ellipsoid 6, which corresponds to the optical axis of the secondary reflector 5, is inclined with respect to the optical axis X-X of the main reflector 1. The external focus Fe5 of the secondary reflector 5 is situated in front of this reflector at a transverse distance towards the bottom of the axis X-X.

The bottom edge 7 of the shield M is situated at the bottom edge of the reflector 5. The shield M is mounted so as to rotate about an axis extending along its bottom edge 7 so as to be able to be retracted from the active position illustrated in FIG. 3 into a retracted position illustrated in FIG. 6 by a rotation of 90° causing it pass from a vertical position (FIG. 3) to a horizontal position (FIG. 6).

An additional lens 8 constituting a duplication of the central part 9 of the main lens L is disposed in front of the secondary reflector 5. The focus of the additional lens 8 is merged with the external focus Fe5 of the secondary reflector 5 or adjacent to this focus. The optical axis of the additional lens 8 is parallel to the axis X-X. The main lens L is advantageously scalloped in a concave part 10 in its bottom part situated facing the secondary reflector 5. The top part of the additional lens 8 fits within this scallop 10, whose shape it matches. According to the embodiment in FIGS. 3 and 6, a step 11 is formed at the junction of the additional lens 8 and the main lens L less thick in the area considered than the additional lens 8. It would however be possible to provide a connection of the additional lens and main lens without this step 11.

Advantageously, the main lens L and the additional lens 8 can be moulded in a single piece, in particular made from transparent plastics material. Alternatively, the lens can be made from glass. In a variant, the additional lens 8 is attached and fixed, in particular by adhesive bonding, to the main lens L.

Figure 3:
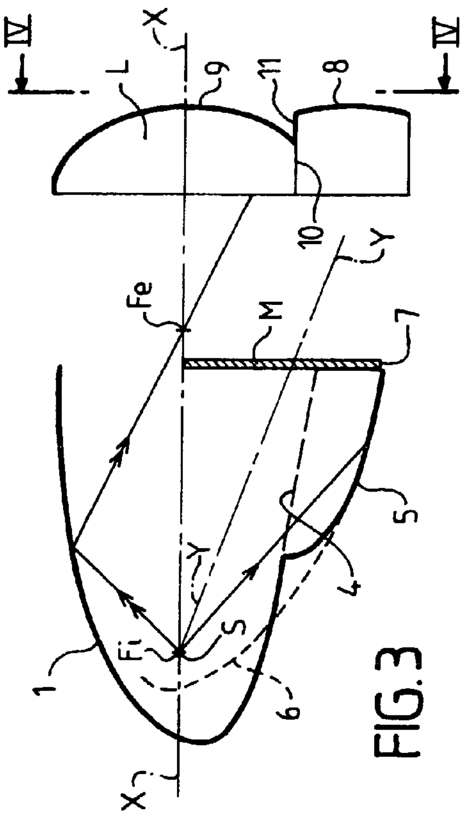
FIG. 3 is a schematic vertical section of a dual-function headlight according to the invention with halogen light source, the shield being in the active position for the dipped function.
Figure 5:
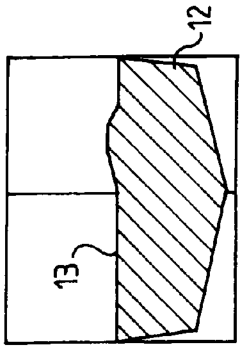
FIG. 5 is a schematic representation of the area illuminated by the headlight of FIG. 3.
Figure 6:
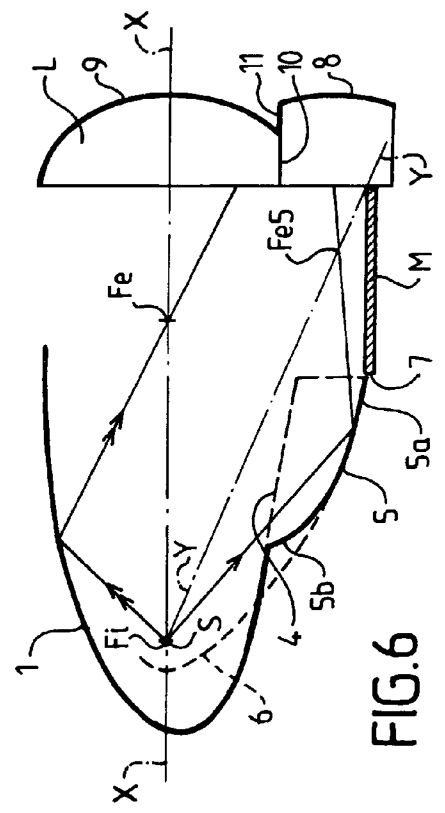
FIG. 6 shows, similarly to FIG. 3, the same headlight with the shield in the retracted position for a main beam without cut-off.

The functioning of the headlight in FIGS. 3 and 6 is as follows. A first function corresponding to a beam with cut-off, namely a dipped beam, is obtained when the source S is switched on and the shield M is in the active position illustrated in FIG. 3, that is to say in the vertical position. The area of illumination on a screen situated in front of the headlight and orthogonal to the axis X-X is illustrated by the hatched area 12 in FIG. 5; this is a simplified representation giving the external contour of the illumination area, without reproducing the isolux curves within this area. The point of maximum illumination is situated substantially halfway across the area, slightly below the top cut-off edge 13 which comprises, in a conventional manner for travelling on the right, a horizontal left-hand part and a right-hand part rising at a given angle of inclination. The edge 13 is an image of the top edge of the shield M.

Figure 7:
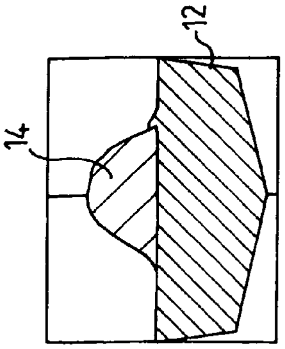
FIG. 7 shows, similarly to FIG. 5, the area illuminated by the headlight in the position in FIG. 6.

When the shield M is folded down in order to provide the second main-beam function, the illumination area, illustrated in FIG. 7, comprises, above the area 12, an area 14 whose isoluxes have not been shown.

The secondary reflector 5 in combination with the additional lens 8 contributes to the reinforcement of the illumination of the area 14 and avoids the need for a supplementary main-beam headlight when the source S is a halogen source with a single filament. The homogeneity and intensity of the beam are improved whatever the light source.

The transverse offset between the optical axis of the main lens L and the additional lens 8 is only a few centimeters and is not noticeable at a distance of 25 m, at which the illumination checking screen is generally placed.

Instead of providing the additional lens 8 at the bottom part of the main lens L, it could be provided on the right or left side, with a corresponding scallop in the main lens. However, the light beam would be slightly degraded and in addition the right and left headlights of the same vehicle would be different.

The example embodiment in FIGS. 3 to 7 have been given with a single additional lens 8. It would however be possible to provide several hollowed-out parts each associated with an additional lens and a corresponding secondary reflector such as 5.

Figure 8:
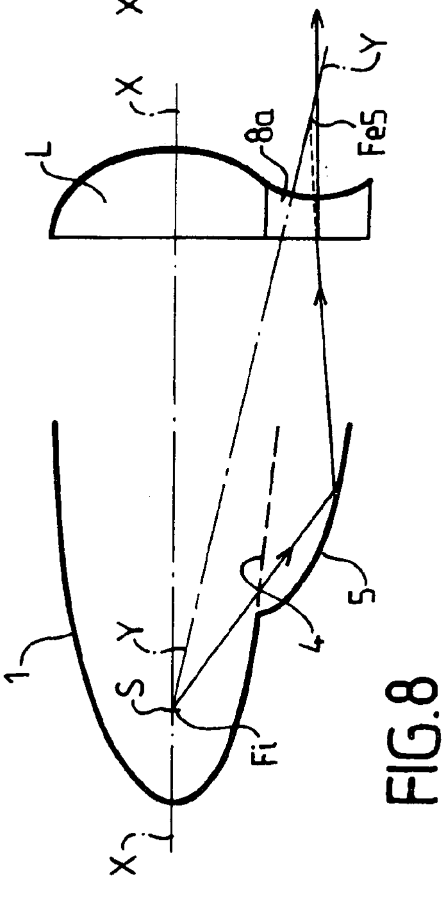
FIG. 8 is a schematic view, similar to FIG. 6, of a variant embodiment with an additional divergent concave lens.

FIG. 8 shows a variant embodiment according to which the additional lens 8*a* is a divergent lens having, for example, a front face concave towards the outside. The external focus Fe5 of the secondary reflector 5 is situated at the front of the concave face of the lens 8*a*, merged with or in the vicinity of the focus of this lens.

The optical axis Y of the secondary reflector 5 is less inclined to the optical axis X-X because the external focus Fe5 is situated further forward than in the case where the additional lens 8 is convex. The result is an improvement in efficacy.

In summary, for the second main-beam function, in the case of a light source of the halogen type, the maximum illumination to be obtained for the main beam does not require any supplementary headlight and results from the combination of the main reflector and an additional optical system implemented with secondary reflector 5 and additional lens 8.

By way of non-limiting example, the-maximum illumination area for the main-beam function must reach 63 lux; 47 lux comes from the main reflector and the additional 16 lux comes from the additional system consisting of secondary reflector 5 with additional lens 8.

In this way a dual-function halogen headlight is produced which is approved alone.

Figure 4:
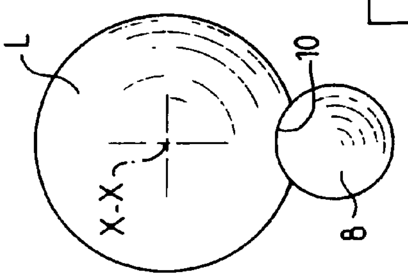
FIG. 4 is a simplified right-hand view with respect to FIG. 3 of the lenses.

In the solution illustrated in FIGS. 3 and 5 with the additional lens 8 situated at the bottom part, the performance of the main-beam function will depend on the main lens L depending on whether it is whole or not. The additional lens 8 can be either integrated in the main lens L as illustrated in FIG. 4 or pressed up against it below.

Figure 9:
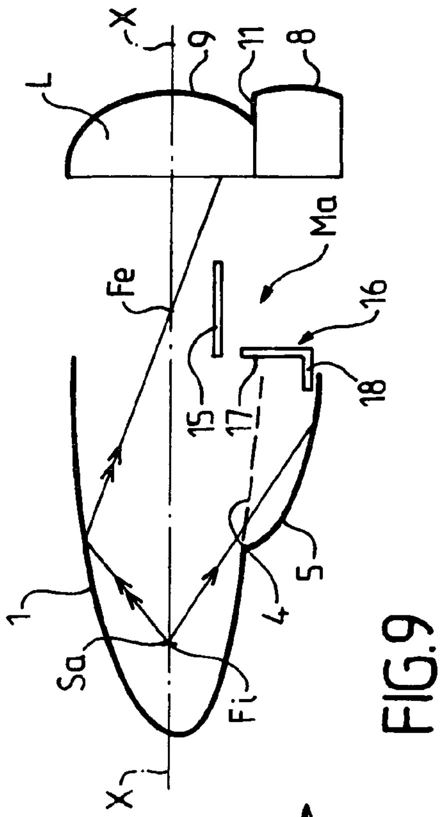
FIG. 9 is a vertical schematic section of a headlight according to the invention with a xenon source comprising a shield consisting of two independent parts, in the main-beam position.
Figure 11:
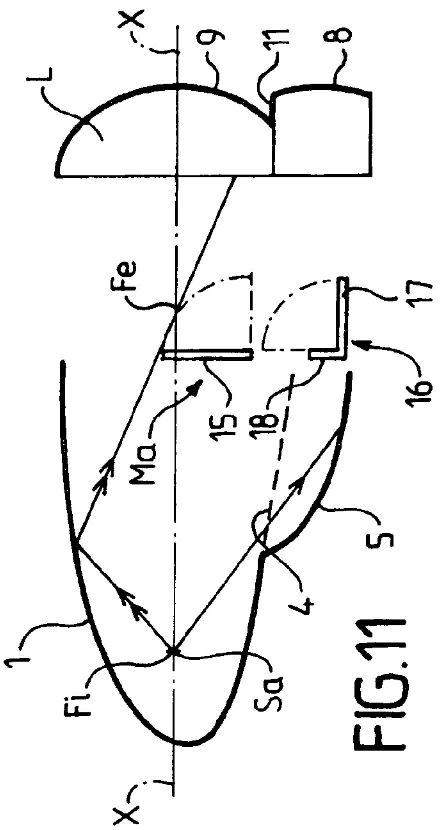
FIG. 11 shows, similarly to FIG. 9, the headlight in a configuration providing a motorway dipped function (AFS) with the first part of the shield in the active position and the second part in the retracted position.
Figure 10:
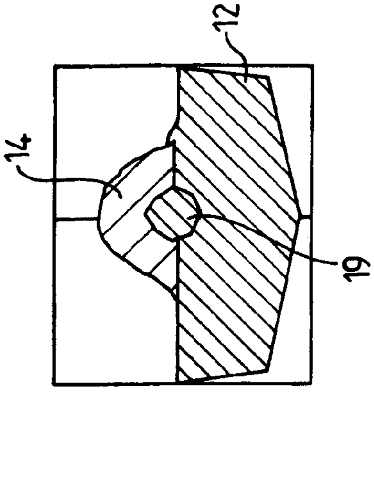
FIG. 10 shows the illumination areas obtained with the headlight of FIG. 9 when the first and second parts of the shield are in the retracted position.

FIGS. 9 to 11 illustrate a variant embodiment with a xenon light source Sa that has higher performance than a halogen source. With such a xenon source, an approved dual main-beam and dipped function is obtained without it being necessary to provide an additional system comprising the secondary reflector 5 and a corresponding additional lens.

However, it is possible to take advantage of the solution of the invention to increase the possibilities offered by the headlight.

As illustrated in FIG. 9, the main reflector I comprises, as in the previous case, a cut-out in the optically non-useful part and the secondary reflector 5 is still connected to the main reflector.

On the other hand, the shield Ma is produced in two parts respectively 15 and 16. The first part 15 corresponds to the top part and is articulated about a transverse axis passing through its bottom edge in order to be able to take a retracted horizontal position illustrated in FIG. 9 or an active vertical position illustrated in FIG. 11.

The bottom part, or second part, 16 of the shield has an L-shaped cross section and is articulated about a horizontal transverse axis passing substantially through the vertex of the right angle formed by the arms 17, 18 of the L. In the active position, illustrated in FIG. 9, the long arm 17 of the L is vertical whilst the arm 18 is horizontal and turned towards the rear. In the retracted position the long arm 17 is horizontal and the small arm 18 is vertical as illustrated in FIG. 11.

The dual-function headlight Sa with xenon source fulfils the first dipped-beam function when the top part 15 of the shield Ma is in the vertical active position and the bottom part 16 has its long arm 17 vertical. This configuration is not shown in the drawing and can be obtained with partial overlap of the bottom area of the part 15 and the top area of the arm 17.

In order to obtain a dipped function, the retraction of the top part 15 is demanded, which passes into the horizontal position as illustrated in FIG. 9, while the long arm 17 remains vertical and essentially masks the beam which normally falls on the additional lens 8.

The illumination area on a screen situated at a distance from the headlight and orthogonal to the optical axis then corresponds to the representation in FIG. 7.

In order to obtain a main-beam function with stronger illumination, the top part 15 of the shield is kept in the horizontal retracted position and the long arm 17 is made to pass from the vertical position to the retracted horizontal position. There is then obtained, as illustrated in FIG. 10, a central illumination area 18 reinforced by virtue of the additional reflector 5/lens 8 optical system.

FIG. 11 illustrates a configuration according to which the top part 15 of the shield is in the active position whilst the short arm 18 of the second part of the shield is vertical and the long arm 17 is horizontal, retracted. This configuration makes it possible to obtain an AFS (Advanced Front Lighting System) function which corresponds to a dipped-beam function on the motorway with a reinforced illumination area below the cut-off line. This cut-off line corresponds to the merged image of the top edges of the shields 15 and 18. When a second cut-off of the dipped-beam type is kept for the top edge of the short arm 18, when it is vertical, care is taken to align the cut-offs provided by the two top edges of the shields 15 and 18. The bottom part 16 of the shield makes it possible, when it passes into the retracted position with the horizontal arm 17, to obtain a supplementary range in dipped or main beam mode.

The configuration for obtaining a main beam with a strong illumination makes it possible to dispense with the problems of loss of maximum in grained lacquer and to keep homogeneity of illumination when the vehicle turns.

The invention makes it possible to produce, with a halogen or xenon light source, a dual-function headlight with an improved beam and which does not require a secondary headlight for the main-beam function.

Compactness of the headlight and a saving in space in the headlight for other functions are obtained.

Though the example according to the invention concerns a dual function it is clear that the invention applies in a similar fashion to systems with more than two functions, by choosing the configuration and shield movement ad hoc.

What is claimed is:

1. A headlight for a motor vehicle designed to fulfill at least two functions, one of the functions corresponding to a beam with cut-off, comprising:

(a) a light source for emitting light rays;

(b) a main elliptical reflector having an optical axis, the main reflector comprising an upper portion disposed above the optical axis, a lower portion disposed below the optical axis and a scalloped part disposed in the lower portion;

(c) a main lens disposed in front of the main elliptical reflector and having an optical axis essentially parallel to the optical axis of the main reflector;

(d) a secondary elliptical reflector coupled to the scalloped part of the main elliptical reflector, the secondary elliptical reflector having an optical axis that is inclined with respect to the optical axis of the main reflector;

(e) an additional lens disposed in front of the secondary reflector, the additional lens having an optical axis essentially parallel to that of the main lens; and (f) a retractable shield movable between at least one active position and a retracted position, whereby when the retractable shield is in an active position the headlight produces a cut-off light beam from the light rays emitted by the light source and when the retractable shield is in the retracted position the headlight produces a light beam other than a cut-off light beam from the light rays emitted by the light source.

2. The headlight according to claim 1, wherein:

(a) the main elliptical reflector has an internal focus and an external focus on its optical axis;

(b) the light source is disposed in the vicinity of the internal focus of the main elliptical reflector;

(c) the main lens has a focus merged with or adjacent to the external focus of the main elliptical reflector;

(d) the retractable shield in the active position having a cut-off edge situated in the vicinity of the focus of the main lens;

(e) the secondary elliptical reflector has an internal focus adjacent to that of the main reflector and an external focus distant from the optical axis of the main elliptical reflector; and (f) the additional lens has a focus close to the external focus of the secondary elliptical reflector.

3. The headlight according to claim 1, wherein the main lens comprises a convergent lens.

4. The headlight according to claim 3, wherein the additional lens comprises a convergent lens.

5. The headlight according to claim 4, wherein the additional lens comprises a duplication of the central part of the main lens.

6. The headlight according to claim 3, wherein the additional lens is a divergent lens.

7. The headlight according to claim 3, wherein the additional lens is coupled to a scalloped part of the main lens.

8. The headlight according to claim 3, wherein the scalloped part of the main lens is disposed opposite the scalloped part of the main reflector.

9. The headlight according to claim 8, wherein the scalloped part of the main lens is disposed in a bottom area of the main lens.

10. The headlight according to claim 8, wherein the scalloped part of the main elliptical reflector is disposed to the right or left of the main elliptical reflector and the scalloped part of the main lens is disposed to the right or left of the main lens.

11. The headlight according to claim 10, wherein the scalloped part of the main elliptical reflector is in an area of the main elliptical reflector that is substantially not useful optically for the cut-off beam.

12. The headlight according to claim 3, wherein the main lens and the additional lens comprise a single moulded piece.

13. The headlight according to claim 12, wherein the retractable shield has a retracted position obtained by rotation of the shield, in particular about its transverse edge distant from the optical axis of the main reflector, or by translation, in particular on a substantially vertical plane.

14. The headlight according to claim 13, wherein the light source is a halogen lamp with a single filament.

15. The headlight according to claim 1, wherein the retractable shield comprises two parts able to be retracted separately, namely a first part closer to the optical axis of the main elliptical reflector, whose retraction makes it possible to obtain a first type of main beam, and second part further away from the optical axis of the main elliptical axis, whose retraction with that of the first part makes it possible to obtain another stronger beam without cut-off.

16. The headlight according to claim 1, wherein the retractable shield has a window at the bottom part.

17. The headlight according to claim 1, wherein the retractable shield is associated with at least one "folder component".

18. The headlight according to claim 15, wherein the cut-off beam is obtained when the two parts of the retractable shield are in the active positions.

19. The headlight according to claim 15, wherein the second part of the retractable shield has a substantially L-shaped cross section with two arms at right angles with different lengths, and is mounted so as to pivot about a transverse axis passing through the vertex of the angle formed by the L.

20. The headlight according to claim 19, wherein the second part of the retractable shield can operate a first angular position in which the long leg of the L is in the active position and cooperates with the first part of the shield in the active position in order to give the cut-off beam, and a second angular position in which the shorter arm of the L is in the active position when the first part is also in the active position, a space existing between the facing edges of the two parts and allowing the passage of light rays in order to reinforce a central area of the cut-off beam.

* * * * *